(12) United States Patent
Liu et al.

(10) Patent No.: US 10,708,122 B1
(45) Date of Patent: Jul. 7, 2020

(54) NETWORK FAULT DETECTION AND QUALITY OF SERVICE IMPROVEMENT SYSTEMS AND METHODS

(71) Applicant: T-Mobile USA, Inc., Bellevue, WA (US)

(72) Inventors: Chunming Liu, Bellevue, WA (US); Amer Hamdan, Lynnwood, NC (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/669,406

(22) Filed: Oct. 30, 2019

(51) Int. Cl.
*H04L 12/24* (2006.01)
*H04W 24/02* (2009.01)
(Continued)

(52) U.S. Cl.
CPC .......... *H04L 41/0677* (2013.01); *H04L 29/14* (2013.01); *H04L 41/0654* (2013.01);
(Continued)

(58) Field of Classification Search
CPC ..... H04L 12/24; H04L 41/0677; H04L 29/04; H04L 29/06; H04L 26/06006; H04L 69/02; H04L 41/022; H04L 41/0226; H04L 41/0695; H04L 12/0654; H04L 12/40169; H04L 12/40176; H04L 29/14; H04L 41/00; H04L 41/06; H04L 45/22; H04L 45/28; H04L 41/0668; H04L 41/0681; H04L 41/0613; H04L 41/0618; H04L 41/0636; H04L 41/0645; H04L 41/065; H04L 41/0654; H04L 41/0659; H04L 41/0672; H04L 41/0823; H04L 49/557; H04L 41/5003; H04L 41/5009; H04L 43/08; H04L 41/08; H04L 43/00; H04L 41/5025; H04L 47/12; G06F 11/00; G06F 11/002; G06F 11/07; G06F 11/3089; G06F 11/34; G06F 11/3428; G06F 11/3447; G06F 11/3452; G06F 11/3466; G06F 11/20;
(Continued)

(56) References Cited

U.S. PATENT DOCUMENTS

| 7,627,321 | B2 * | 12/2009 | Antoniou et al. ............ 455/445 |
| 7,908,209 | B2 * | 3/2011 | Tovinger ......................... 705/38 |
| 9,294,342 | B2 * | 3/2016 | Okuno et al. ....... H04L 41/0668 |
| 9,768,833 | B2 * | 9/2017 | Fuchs et al. .......... H04B 3/544 |

(Continued)

*Primary Examiner* — Meless N Zewdu
(74) *Attorney, Agent, or Firm* — Perkins Coie LLP

(57) ABSTRACT

A Quality of Service (QoS) improvement system and method for transport network fault detection and QoS improvement so that a telecommunication network service provider can analyze the root cause on chronic performance issues and recommend potential solutions is disclosed. The system runs performance analysis on each AAV (mobile backhaul) or other transport networks and collects performance related metrics data. The system then selects a subset of the data related to certain key performance indicators (KPIs), such as latency, jitter, packet loss ratio, and availability. On this subset of KPI-related data, the system applies clustering techniques to identify clusters with similar performance issues. For each cluster, the system binds the AAV performance KPI data with one or more of the following site features—health, location, vendor, market, service type, etc.—to create a cluster map. The system can then generate inferences on root causes of the performance issues.

20 Claims, 20 Drawing Sheets

(51) Int. Cl.
*H04W 24/10* (2009.01)
*H04W 8/30* (2009.01)
*H04W 4/02* (2018.01)
*H04L 29/14* (2006.01)
*H04W 84/04* (2009.01)

(52) U.S. Cl.
CPC ...... *H04L 41/0695* (2013.01); *H04L 41/5025* (2013.01); *H04W 4/02* (2013.01); *H04W 8/30* (2013.01); *H04W 24/02* (2013.01); *H04W 24/10* (2013.01); *H04W 84/042* (2013.01)

(58) Field of Classification Search
CPC ............. G06F 11/3409; G06F 11/3457; G06F 11/3612; H04W 24/02; H04W 88/042; H04W 24/10; H04W 4/02; H04W 24/04; H04W 24/08; H04W 24/06; H04W 84/042; H04W 8/30; H04W 28/04; H04W 36/30; H04W 72/085; H04W 72/1231; H04W 24/00

See application file for complete search history.

(56) References Cited

U.S. PATENT DOCUMENTS

| | | | |
|---|---|---|---|
| 9,930,551 B2* | 3/2018 | Futaki et al. | H04W 24/08 |
| 9,980,187 B2* | 5/2018 | Dribinski et al. | H04W 36/0088 |
| 10,109,167 B1* | 10/2018 | Olekas et al. | G08B 13/24 |
| 10,477,426 B1* | 11/2019 | Tiwri et al. | H04W 24/10 |
| 2011/0098981 A1* | 4/2011 | Bobst | 702/190 |
| 2015/0036619 A1* | 2/2015 | Nishimura et al. | H04W 74/06 |
| 2016/0323163 A1* | 11/2016 | Abdulnour et al. | H04L 43/0811 |
| 2017/0012841 A1* | 1/2017 | Ketheesan et al. | H04L 43/08 |
| 2017/0012847 A1* | 1/2017 | Liensberger et al. | H04L 43/0876 |
| 2017/0031565 A1* | 2/2017 | Chauhan et al. | G06F 3/04842 |
| 2017/0083585 A1* | 3/2017 | Chen et al. | G06F 17/30525 |
| 2017/0126521 A1* | 5/2017 | Lala | H04L 43/045 |
| 2018/0115455 A1* | 4/2018 | Srrano Garcia et al. | H04L 41/0631 |
| 2018/0367370 A1* | 12/2018 | Tapia et al. | H04L 41/0631 |
| 2019/0215230 A1* | 7/2019 | Mermoud et al. | H04L 41/064 |

* cited by examiner

| Cluster | Total Site Numbers | Delay (ms)* | Jitter (ms)* | Frame Loss Ratio (FLR)* |
|---|---|---|---|---|
| Cluster 0 | 54559 | 4.14 | 0.06 | 0.21% |
| Cluster 1 | 19 | 546 | 11 | 0.50% |
| Cluster 2 | 1987 | 5.95 | 0.04 | 45.72% |
| Cluster 3 | 295 | 24 | 6.4 | 17.15% |

| Cluster No. | AAV Name | SITE ID |
|---|---|---|
| 3 | Vendor 4 | 294 |
| 3 | Vendor 5 | 56 |
| 3 | Vendor 2 | 44 |
| 3 | Vendor 6 | 39 |
| 3 | Vendor 7 | 21 |

| Cluster No. | AAV Name | SITE ID |
|---|---|---|
| 1 | Vendor 11 | 38 |

| Cluster No. | AAV Name | SITE ID |
|---|---|---|
| 2 | Vendor 2 | 843 |
| 2 | Vendor 8 | 661 |
| 2 | Vendor 9 | 405 |
| 2 | Vendor 7 | 290 |
| 2 | Vendor 10 | 279 |

KPI features for cluster 0 (High FLR)
Avg Delay           5.13
Avg Jitter          0.062
Frame Loss Ratio %  34.06

KPI features for cluster 1 (Minor FLR)
Avg Delay           4.18
Avg Jitter          0.094
Frame Loss Ratio %  0.373

KPI features for cluster 2 (High Delay/Jitter)
Avg Delay           546.90
Avg Jitter          11.89
Frame Loss Ratio %  0.53

KPI features for cluster 3 (High FLR & Delay)
Avg Delay           24.34
Avg Jitter          6.32
Frame Loss Ratio %  16.71

*FIG. 5I*

NETWORK FAULT DETECTION AND QUALITY OF SERVICE IMPROVEMENT SYSTEMS AND METHODS

BACKGROUND

To support end-to-end connectivity, telecommunication network service providers (e.g., ATT, Verizon, T-Mobile, Sprint, etc.) rely on one or more carrier networks/vendors (alternative access networks, AAV) to provide backhaul support and connectivity. Since these carrier networks function like black-boxes from telecommunication network service provider's perspective, it is difficult for the telecommunication network service provider to detect, identify, and troubleshoot connectivity and/or network performance issues occurring as a result of these vendors. For example, it is very difficult for a telecommunication network service provider to do troubleshooting with the carrier network vendors because these vendors usually do not agree with the telecommunication network service provider's performance data. And no root cause analysis is available to the telecommunication network service providers on AAV performance issues and outage. As a result, the telecommunication network service provider is unable to provide the optimum level of service and performance to its customers.

BRIEF DESCRIPTION OF THE DRAWINGS

FIGS. 5A-5I are example charts illustrating results of applying clustering models on information of various key performance indicators.

FIGS. 6A-7C are example reports that can be used to identify/analyze network fault trends.

Figure 1A:
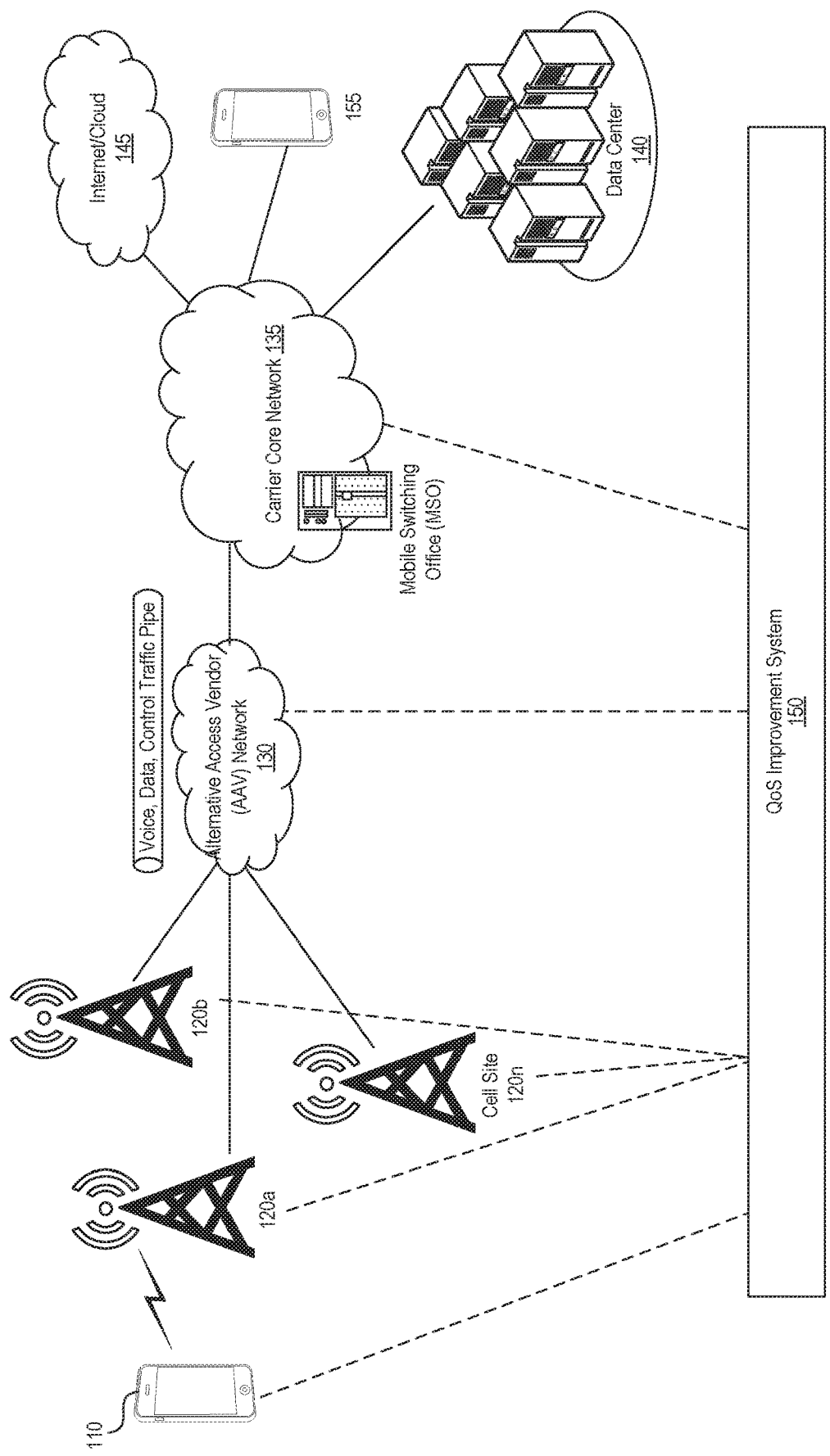
FIGS. 1A-1B are block diagrams illustrating suitable environments within which a Quality of Service (QoS) improvement system operates.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

To solve the above and other problems, the inventors have devised a Quality of Service (QoS) improvement system and method for transport network fault detection and quality of service (QoS) improvement so that a telecommunication network service provider can analyze the root cause on chronic performance issues and recommend potential solutions. For instance, the QoS improvement system can help identify whether a transport network fault is occurring due to AAV issues, telecommunication network service provider issues, or any combination of the two. The system runs performance analysis on each AAV (mobile backhaul) and collects performance related metrics data. The system then selects a subset of the data related to certain key performance indicators (KPIs), such as latency, jitter, packet loss ratio, and availability. On this subset of KPI-related data, the system applies clustering techniques to identify clusters with similar performance issues. For each cluster, the system binds the AAV performance KPI data with one or more of the following site features—health, location, vendor, market, etc.—to create a cluster map. For example, the system creates a cluster map with location feature to see similarities of their service areas. The system can then map the updated clusters with time, vendor, and/or market to identify chronic performance patterns. Using this information, the system can then generate inferences on root causes of the performance issues (which are likely caused by vendor network issues). For example, if a group of nearby sites share similar performance issues over time, then there is a higher probability that something negative happened in the vendor-shared equipment or links. In this manner, the method enables improvement in automation, efficiency, and accuracy of network fault detection. For instance, by providing greater visibility into the causes of network fault, the system enables telecommunications service providers to: enforce performance service level agreements (SLAs) with AAVs (e.g., resulting in costs savings in the form of performance credits from SLAs), accurately identify sources and/or locations of faults for efficient remediation (vendor performance investigation and/or improvement, root cause analysis, etc.), improve performance and troubleshooting efficiency (e.g., from multiple month to a matter of days/hours), avoid network outage with timely maintenance (reliability), track vendor issues, and so on.

In the following description, for the purposes of explanation, numerous specific details are set forth in order to provide a thorough understanding of implementations of the present technology. It will be apparent, however, to one skilled in the art that implementations of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Suitable Environments

Figure 1B:
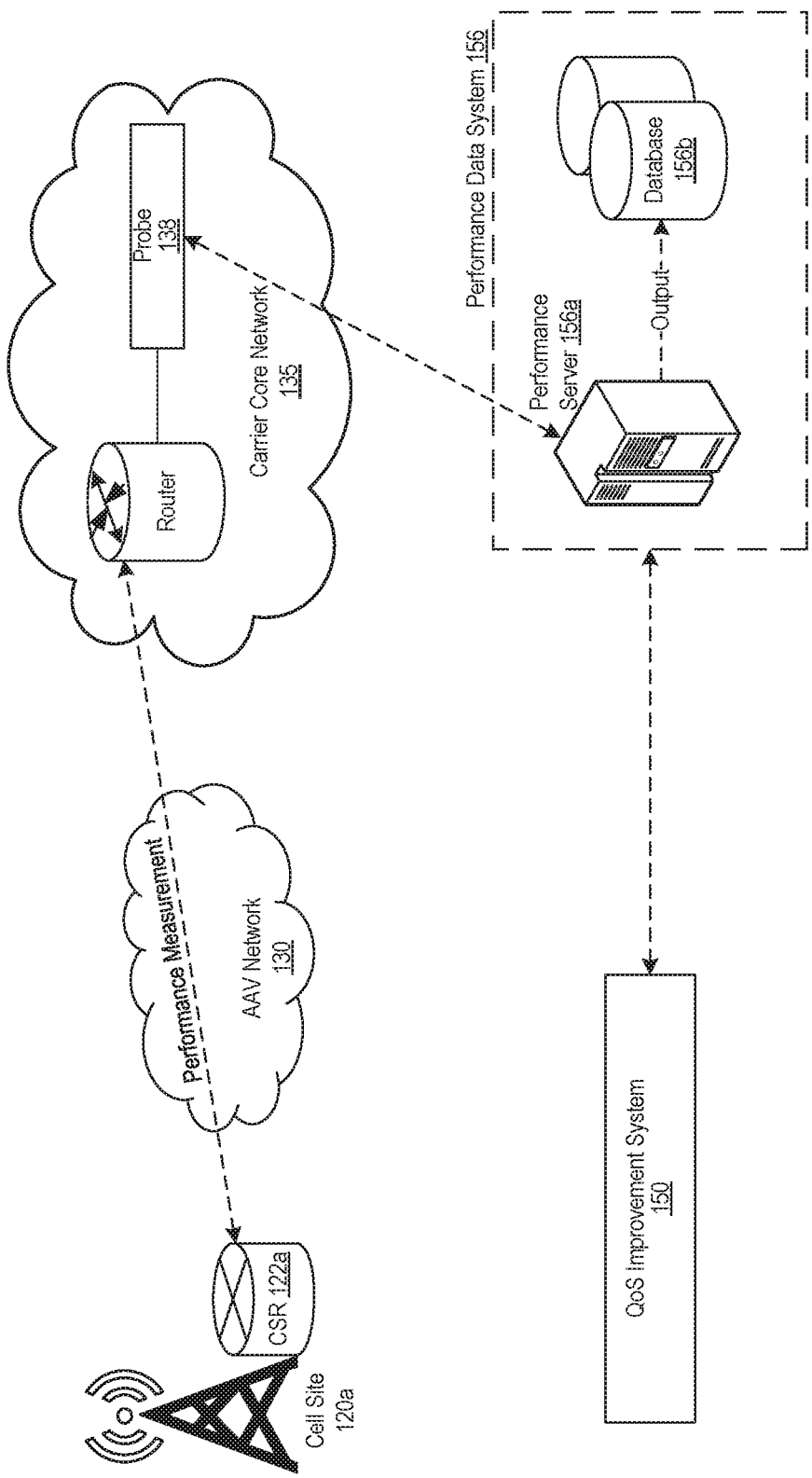

FIGS. 1A-1B are block diagrams illustrating suitable environments within which a Quality of Service (QoS) improvement system operates.

One or more user devices 110, such as mobile devices or user equipment (UE) associated with users (such as mobile phones (e.g., smartphones), tablet computers, laptops, and so on), Internet of Things (IoT) devices, devices with sensors, and so on, receive and transmit data, stream content, and/or perform other communications or receive services over an alternative access vendor (AAV) network 130 and a carrier core network 135, which are accessed by the user device 110 over one or more cell sites 120a-120n via cell switch routers (122a). For example, the user device 110 can access a carrier core network 135 via a cell site 120a at a geographical location that includes the cell site, in order to transmit and receive data (e.g., stream or upload multimedia content)

from various entities, such as a content provider/data center 140, Internet/cloud data repository 145, and/or other user devices 155 on the network 135. The AAV network 130 is a third-party carrier network connecting cell sites 120a-120n of a carrier (e.g., Verizon, ATT, T-Mobile, etc.) with the carrier's core network 135.

The cell sites 120a-120n can include macro cell sites, such as base stations, small cell sites, such as picocells, microcells, or femtocells, and/or other network access component or sites (including IEEE 802.11 WLAN access points). The cell cites 120a-120n can store data associated with their operations, including data associated with the number and types of connected users, data associated with the provision and/or utilization of a spectrum, radio band, frequency channel, and so on, provided by the cell sites, and so on. The cell sites 120a-120n can monitor their use, such as the provisioning or utilization of PRBs provided by a cell site physical layer in LTE network. For example, a cell site 120 having a channel bandwidth of 5 MHz that provides 25 available physical resource blocks through which data can be transmitted to/from the user device 110.

Other components provided by the carrier core network 135 can monitor and/or measure the operations and transmission characteristics of the cell sites 120a-120n and other network access components. For example, the carrier core network 135 can provide a network monitoring system, via a network resource controller (NRC) or network performance and monitoring controller, or other network control component, in order to measure and/or obtain the data associated with the utilization of cell sites 120a-120n when data is transmitted within a telecommunications network.

The computing environment 100 includes a QoS improvement system 150 configured to monitor aspects of the networks 130 and 135 based on, for example, data accessed/received from the performance data system 156. The performance data system 156 can measure values for various metrics (including, for example, key performance metrics, such as jitter, frame loss ratio, availability, etc.) at the AAV network 130, carrier core network 135, cell sites (e.g., cell sites 120a-120n), etc. to evaluate and select optimum network fault remediation actions to be deployed at various points in the communication pathway (e.g., at the AAV network 130) to improve network performance as described in detail below. The performance data system 156 can measure values using a performance server 156a, which is in communication with probes (e.g., a Sprient probe) 138 in the carrier core network 135, and store the performance-related measurement values (performance measurement data records) in database 156b. The AAV performance-related measurements values can be gathered using one or more of the following: TWAMP PM (performance measurement with two-way active measurement protocol (TWAMP) and Sprient system), in real-time (e.g., five packets for four class-of-service (e.g., voice, data, control, and management) per second per Enhanced Video Connection (EVC), measurements by Sprient probes in each Mobile Switch Office (MSO) trigger tests, measurements using cross-layer pipeline (e.g., life-cycle measurement, data collection, storage, analytics, and reporting), and so on). The performance measurement data records can comprise information related to an associated location (e.g., where the record was generated), associated AAV (e.g., AAV vendor name, identifier, location, SLA, etc.), associated market, site identifier, circuit identifier (e.g., identifier which specifies the EVC circuit connecting cellular site and MSO over vendor network), IP address, port number, measurement protocol like TWAMP, longitude and latitude of the site, market, region, measurement starting time, measurement ending time, measurement granularity, average round-trip latency, average round-trip jitter, frame loss ratio (FLR), maximum latency, maximum jitter, maximum FLR, and so on.

AAV network's 130 performance is critical in user experience and network quality due to its "bridge" functionality. Thus, it is imperative to identify where a transport network fault is hidden by measuring and evaluating performance data. For example, it is beneficial to identify whether the network fault is present in the AAV network 130 or in the carrier core network 135. Such root cause identification and analysis for chronic performance issues can enable improvement in user experience and network quality.

FIG. 1 and the discussion herein provide a brief, general description of a suitable computing environment 100 in which the QoS improvement system 150 can be supported and implemented. Although not required, aspects of the QoS improvement system 150 are described in the general context of computer-executable instructions, such as routines executed by a computer, e.g., mobile device, a server computer, or personal computer. The system can be practiced with other communications, data processing, or computer system configurations, including: Internet appliances, hand-held devices (including tablet computers and/or personal digital assistants (PDAs)), Internet of Things (IoT) devices, all manner of cellular or mobile phones, multi-processor systems, microprocessor-based or programmable consumer electronics, set-top boxes, network PCs, mini-computers, mainframe computers, and the like. Indeed, the terms "computer," "host," and "host computer," and "mobile device" and "handset" are generally used interchangeably herein, and refer to any of the above devices and systems, as well as any data processor.

Aspects of the system can be embodied in a special purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through any communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory computer-readable storage media), including magnetically or optically readable computer discs, hard-wired or preprogrammed chips (e.g., EEPROM semiconductor chips), nanotechnology memory, or other data storage media. Indeed, computer implemented instructions, data structures, screen displays, and other data under aspects of the system can be distributed over the Internet or over other networks (including wireless networks), on a propagated signal on a propagation medium (e.g., an electromagnetic wave(s), a sound wave, etc.) over a period of time, or they can be provided on any analog or digital network (packet switched, circuit switched, or other scheme). Portions of the system reside on a server computer, while corresponding portions reside on a client computer such as a mobile or portable device, and thus, while certain hardware platforms are described herein, aspects of the system are equally applicable to nodes on a network. In an alternative implementation, the mobile device or portable device can represent the server portion, while the server can represent the client portion.

In some implementations, the user device 110 and/or the cell sites 120a-120n can include network communication components that enable the devices to communicate with remote servers or other portable electronic devices by transmitting and receiving wireless signals using a licensed, semi-licensed, or unlicensed spectrum over communications network, such as networks 130 and 135. In some cases, the communication networks 130 and/or 135 can be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. The telecommunications networks 130 and/or 135 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network, 5G mobile communications network, IEEE 802.11 (WiFi), or other communications networks. Thus, the user device is configured to operate and switch among multiple frequency bands for receiving and/or transmitting data.

Further details regarding the operation and implementation of the QoS improvement system 150 will now be described.

Figure 2:
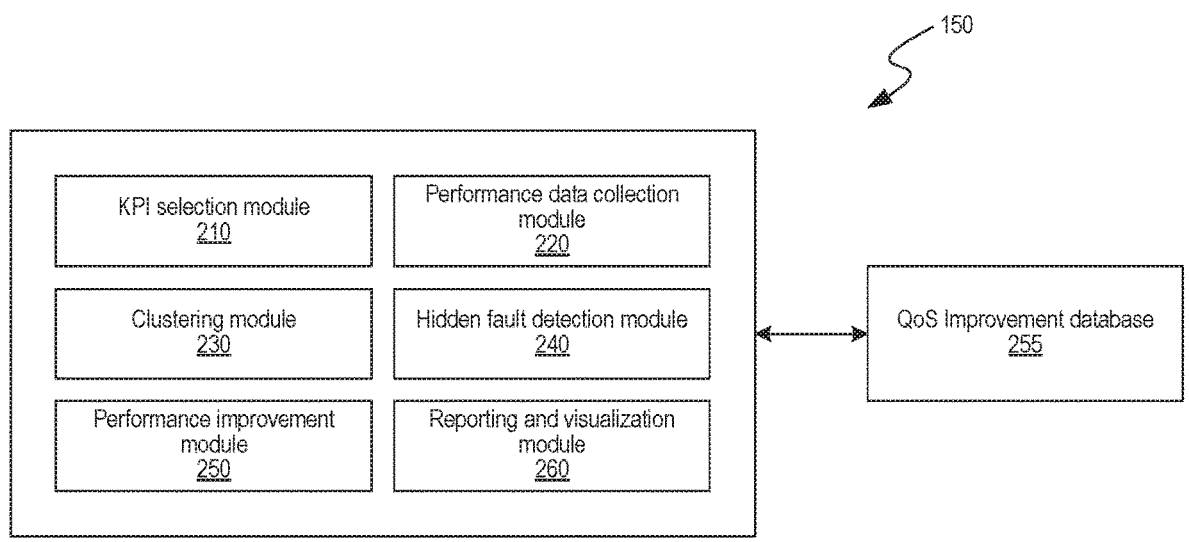
FIG. 2 is a block diagram illustrating the components of the QoS improvement system.

Examples of Transport Network Fault Detection and Quality of Service (QOS) Improvement Solutions FIG. 2 is a block diagram illustrating the components of the QoS improvement system 150. The QoS improvement system 150 can include functional modules that are implemented with a combination of software (e.g., executable instructions, or computer code) and hardware (e.g., at least a memory and processor). Accordingly, as used herein, in some examples a module is a processor-implemented module or set of code, and represents a computing device having a processor that is at least temporarily configured and/or programmed by executable instructions stored in memory to perform one or more of the specific functions described herein. For example, the QoS improvement system 150 can include a KPIs selection module 210, a performance data collection module 220, a clustering module 230, a hidden fault detection module 240, a performance improvement module 250, and a reporting and visualization module 260, each of which is discussed separately below.

The KPIs Selection Module

The KPIs selection module 210 is configured and/or programmed to select a subset of KPIs from a set of Performance Indicators (PIs). The set of PIs comprises hundreds (for example 200-300) of performance indicators, each of which can be used to measure an aspect of performance of a specific AAV. For example, the set of PIs can include some or all of the following performance indicators: delay, jitter, frame loss ratio, availability, traffic intensity, number of users, dropped call rate, PRB utilization, CQI, throughput, bandwidth, bandwidth utilization, carrier aggregation, advanced Quadrature Amplitude Modulation (QAM) efficiency, device health such as CPU utilization, memory utilization, available memory, I/O dropped frame percentage, system alarms, MTTR, MTTF, alternate/available AAV, population served by the AAV, households served by the AAV, and so on.

From this set of numerous performance indicators, the KPIs selection module 210 selects a subset of key performance indicators to be used to evaluate and compare impact/performance of various network performance improvement solutions. The KPIs selection module 210 selects the subset of key performance indicators based on one or more of the following factors: correlation of each performance indicator with network performance, correlation of each performance indicator with customer experience, correlation of each performance indicator with other performance indicators, user (for example, administrator) preference, telecommunications service provider preference, and so on. For instance, the KPIs selection module 210 selects performance indicators which exhibit a low degree of correlation yet reflect the dimensions of the overall composite. For example, the KPIs selection module 210 selects the following key performance indicators as components of the subset of key performance indicators: delay, jitter, frame loss ratio, and availability. Alternatively or additionally, the KPIs selection module 210 selects a top threshold number of performance indicators having a maximum correlation with the customer experience. In some implementations, the KPIs selection module 210 selects components of the subset of key performance indicators based on principal component analysis, bandwidth utilization, alarm numbers, device health statistics such as CPU utilization, memory utilization, I/O utilization/busy time length, and so on.

The Performance Data Collection Module

The performance data collection module 220 is configured and/or programmed to receive data from one or more sources regarding values of the performance indicators in the subset of key performance indicators and/or the set of performance indicators. The performance data collection module 220 can retrieve performance data (performance measurement data records or AAV performance KPI data) maintained/stored by the performance data system (FIG. 1B, 156) and/or the QoS improvement database 255. The performance measurement data records can comprise information related to an associated location (e.g., where the record was generated), associated AAV, associated market, and so on. The performance data collection module 220 can retrieve data at a certain granularity (e.g., daily, weekly, monthly, quarterly, yearly, etc.) based on one or more of the following factors: AAV identity, market, service type, location, SLA, and so on. For example, for a first AAV, the performance data collection module 220 retrieves monthly data for analysis, whereas for a second (more reliable AAV), the performance data collection module 220 retrieves semi-annual data. In several implementations, the performance data collection module 220 retrieves weekly, daily or even hourly data to provide more granularity.

Figure 4A:
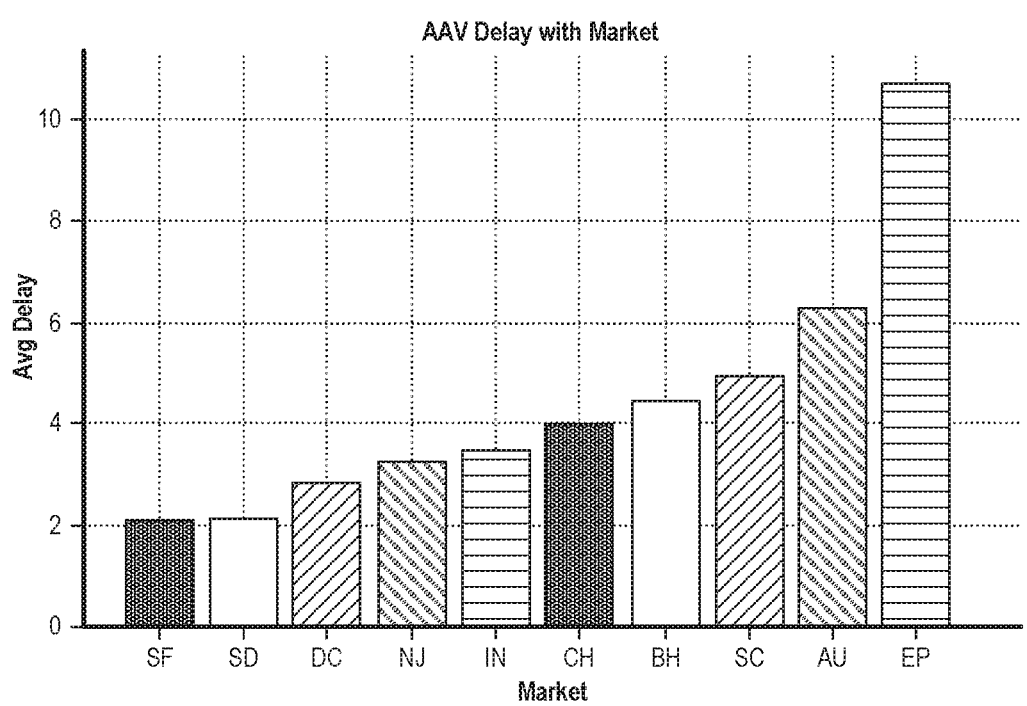
FIGS. 4A-4C are example charts illustrating information of various key performance indicators.
Figure 4B:
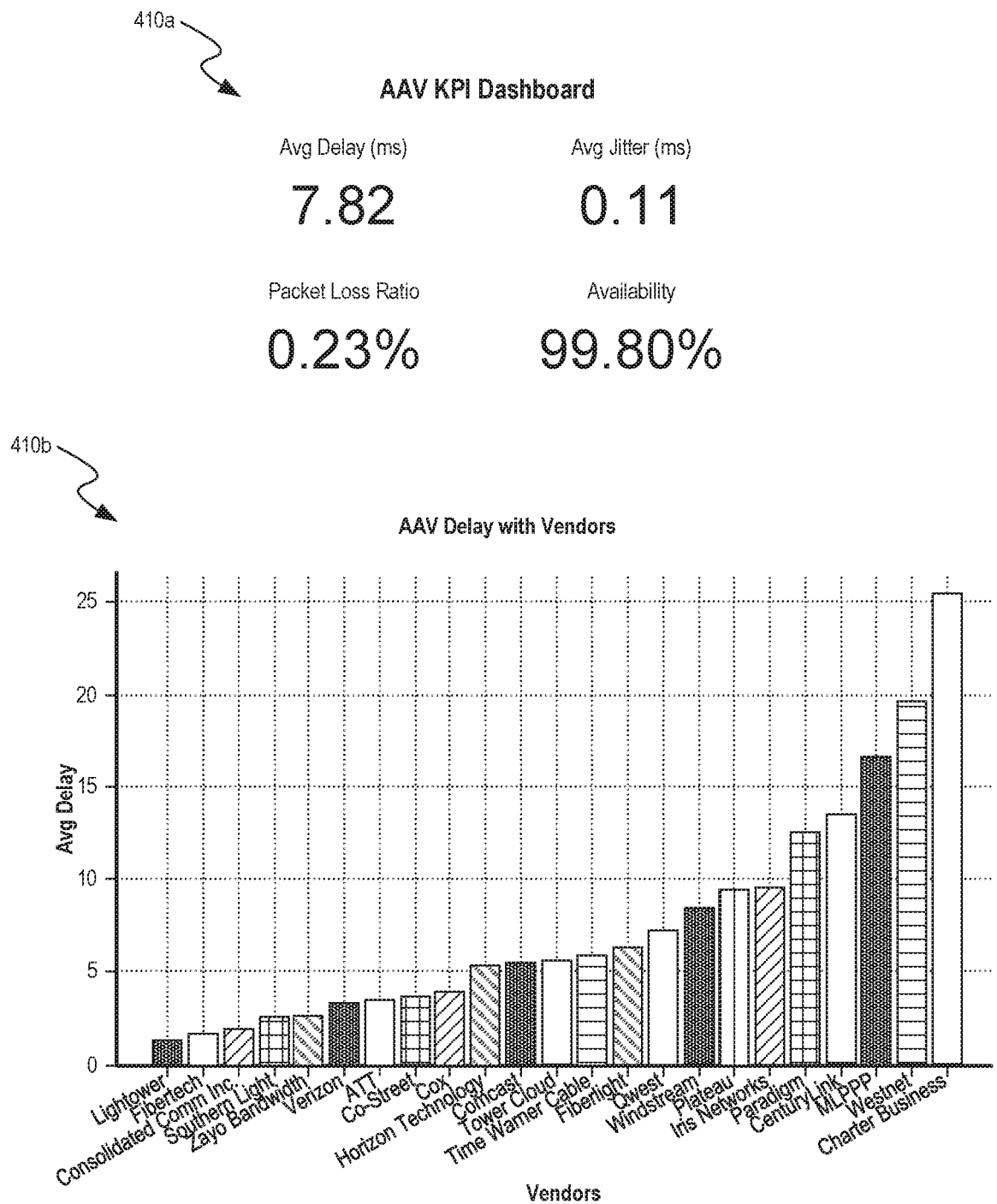
Figure 4C:
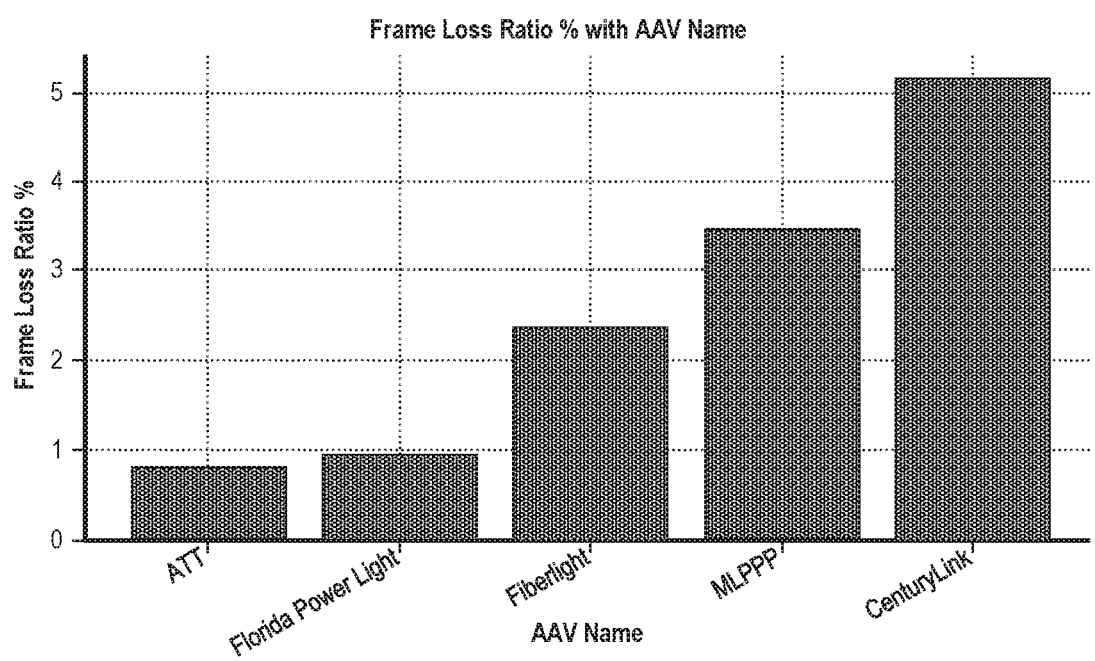

FIGS. 4A-4C are example charts illustrating performance data of various key performance indicators. FIG. 4A illustrates chart 405 that shows the values of KPI average delay associated with various markets (e.g., San Francisco, San Diego, Washington D.C., and so on). FIG. 4B illustrates report 410a that shows values of four KPIs—average delay, average jitter, packet loss ratio, and availability—associated with various AAV vendors (e.g., Lightower, Fibertech, ATT, and so on). FIG. 4B further illustrates chart 410b that shows the values of KPI average delay associated with various vendors. FIG. 4C illustrates chart 415 that shows the values of KPI frame loss ratio associated with various vendors. The KPI values can differ from vendor to vendor, and market to market. In several implementations, the performance data collection module 220 retrieves performance data for every time period t (e.g., every week, month, quarter, year, and so on).

In several implementations, the performance data collection module 220 can collect the values of the performance indicators before a particular network fault remediation action/solution is deployed (pre-solution deployment), after the particular network fault remediation action/solution is deployed (post-solution deployment), or both.

The performance data collection module 220 collects/receives/accesses one or more of the following data records associated with the performance indicators (which can be stored in the QoS improvement database 255): location specific records (LSR), call data records (CDRs), timing advance values, RF signal data, distance between the customer and at least one telecommunications network site, strength of signal, quantity of data used, type of device of the customer, applications data (e.g., application type, name, owner, manager, data sent/received/used/saved, bandwidth used, APIs accessed, etc.), source of usage records (for example, telecommunications service provider, third-party, application owner, etc.). Examples of other types of data collected by the performance data collection module 220 include, but are not limited to, data collected from third party applications (e.g., including crowdsourced data) that can help to determine customer experience with location. For example, the performance data collection module 220 can collect information of a user's location using his/her social media posts (e.g., tweets, check-ins, posts, etc.). As another example, the performance data collection module 220 collects application level data (e.g., collected using applications related to Internet of Things (IoT) devices, sensors, billing meters, traffic lights, etc.) to identify the user location and/or data related to the performance indicators.

The Clustering Module

The clustering module 230 is configured and/or programmed to apply clustering techniques to detect clusters with similar performance issues. The clustering module 230 can apply k-means clustering or other clustering machine learning algorithm(s) to divide the performance values of the selected KPIs into different groups based on their performance similarity distance (e.g., Euclidian distance). In several implementations, the clustering module 230 applies techniques such as the elbow method, silhouette analysis, etc. to determine an optimal value of k-number in k-means clustering, which help in determining final cluster number for the performance data. After generating the clusters, the clustering module 230 can bind the AAV performance KPI data with one or more of the following site/store/office features—health, location, vendor, market, etc.—to create a cluster map, which can be used to determine if there are multiple sites/stores/offices nearby with similar performance pattern and in a same performance cluster. For example, the clustering module 230 creates a cluster map with location feature to see similarities of their service areas. The clustering module 230 can then map the updated clusters with time, vendor, and/or market to identify chronic performance patterns.

Figure 5A:
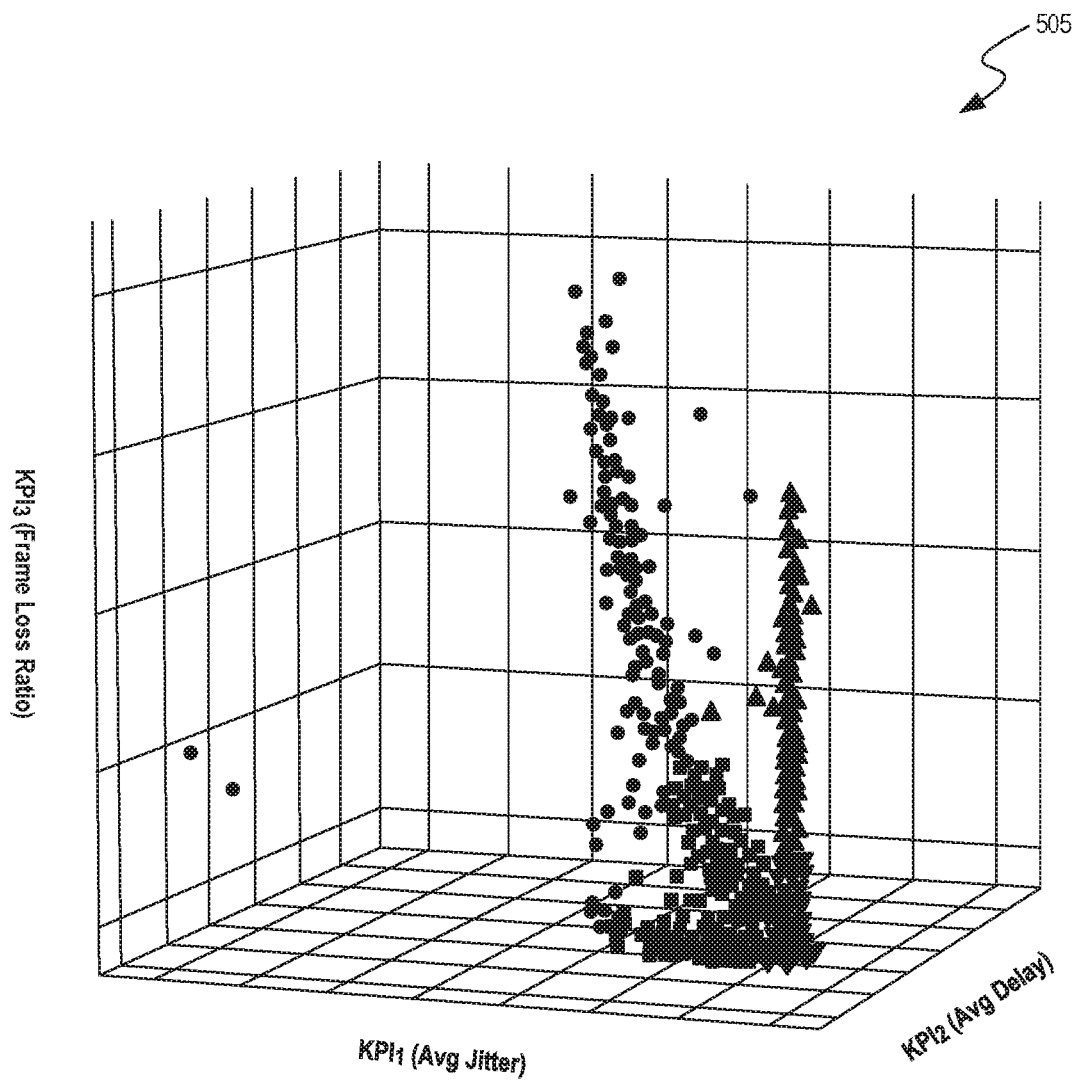

FIGS. 5A-5I are example charts illustrating results of applying clustering models on information of various key performance indicators. The clustering module 230 can first run performance analysis on AAV performance KPI data, as illustrated in FIG. 5A (a chart 505 depicting normalized performance distribution). Using the performance analysis results, the clustering module can determine the distribution of the AAV performance KPI data. For example, for the normalized performance distribution illustrated in FIG. 5A, the clustering module 230 determines that the AAV performance KPI data (latency, jitter, and frame loss ratio) are unevenly distributed, and that many sites suffer from bad performance.

Figure 5B:
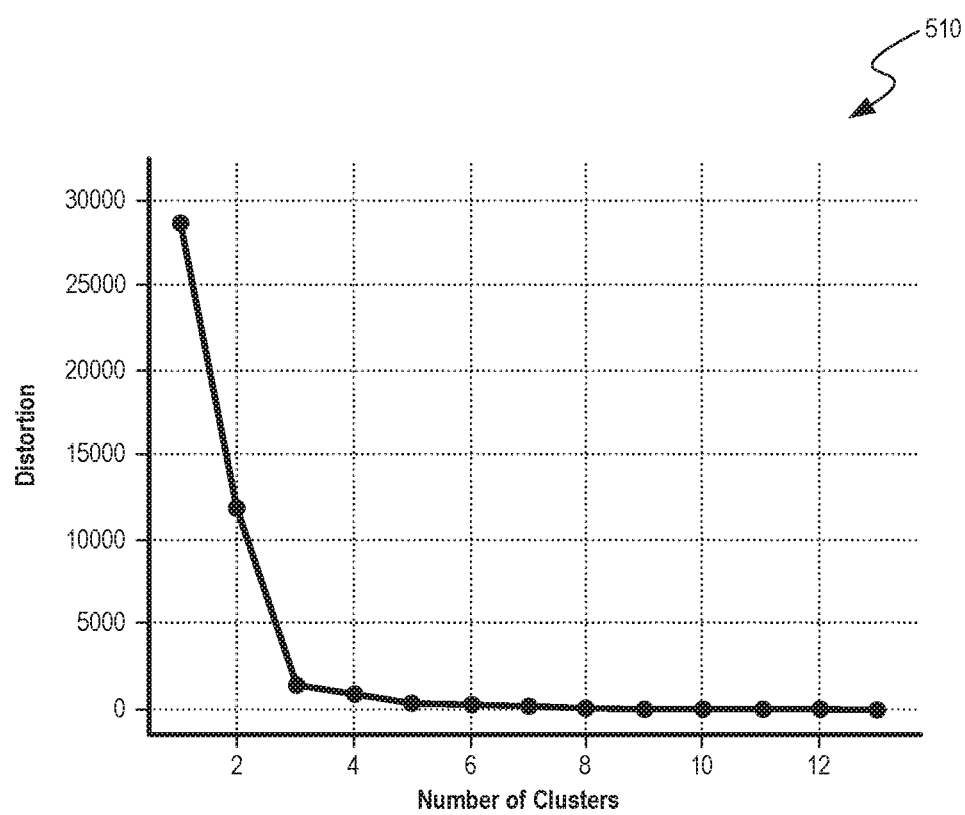
Figure 5C:
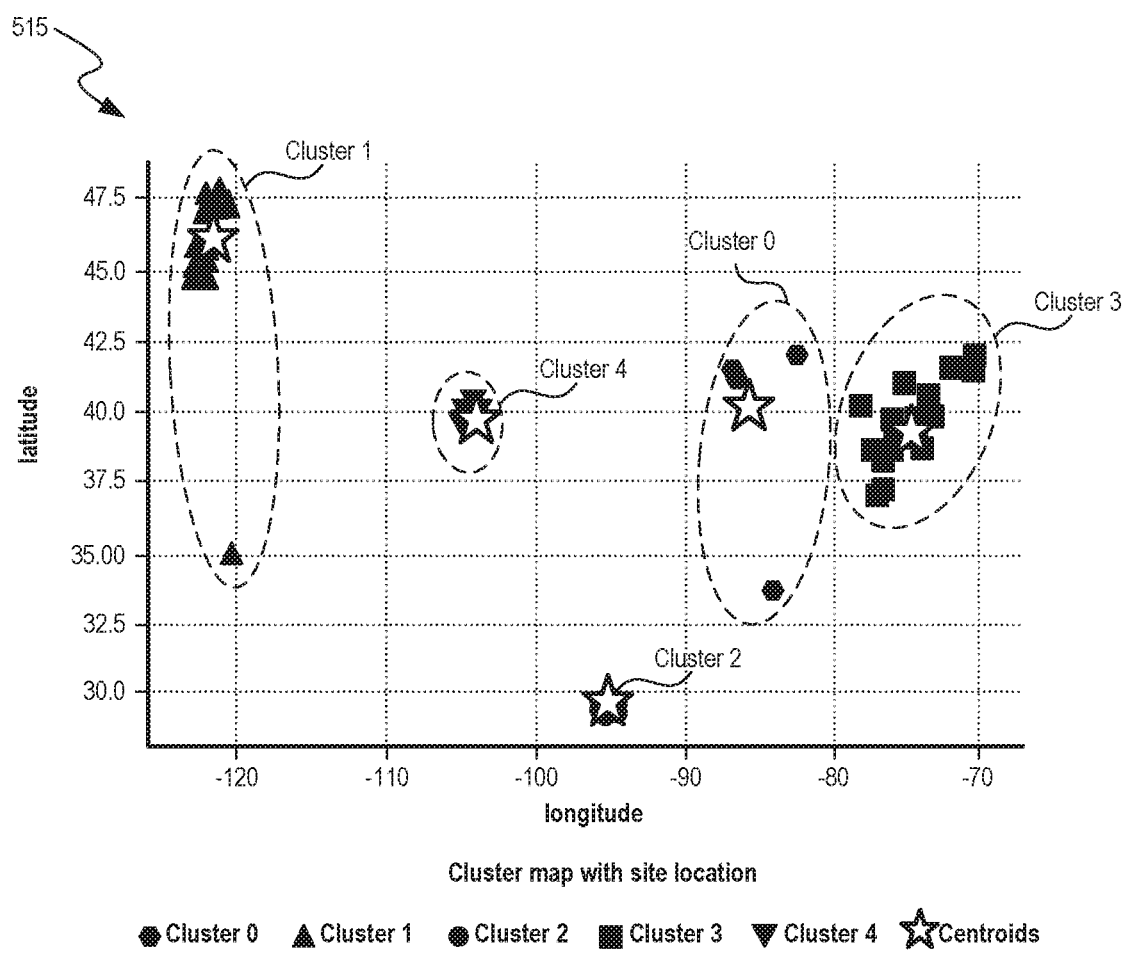
Figure 5D:

The clustering module 230 then applies data-analytics techniques with k-means clustering to identify an optimal k-value (using, e.g., the elbow method, the silhouette method, etc.). For example, as illustrated in FIG. 5B, the clustering module 230 depicts a chart 510 that identifies an optimal k-value as four (4) for the performance data illustrated in FIG. 5A. Each cluster features are differentiated by its centroid KPI values, for example as shown in table 520 of FIG. 5D.

Figure 5E:
Figure 5E:
Figure 5E:
Figure 5F:
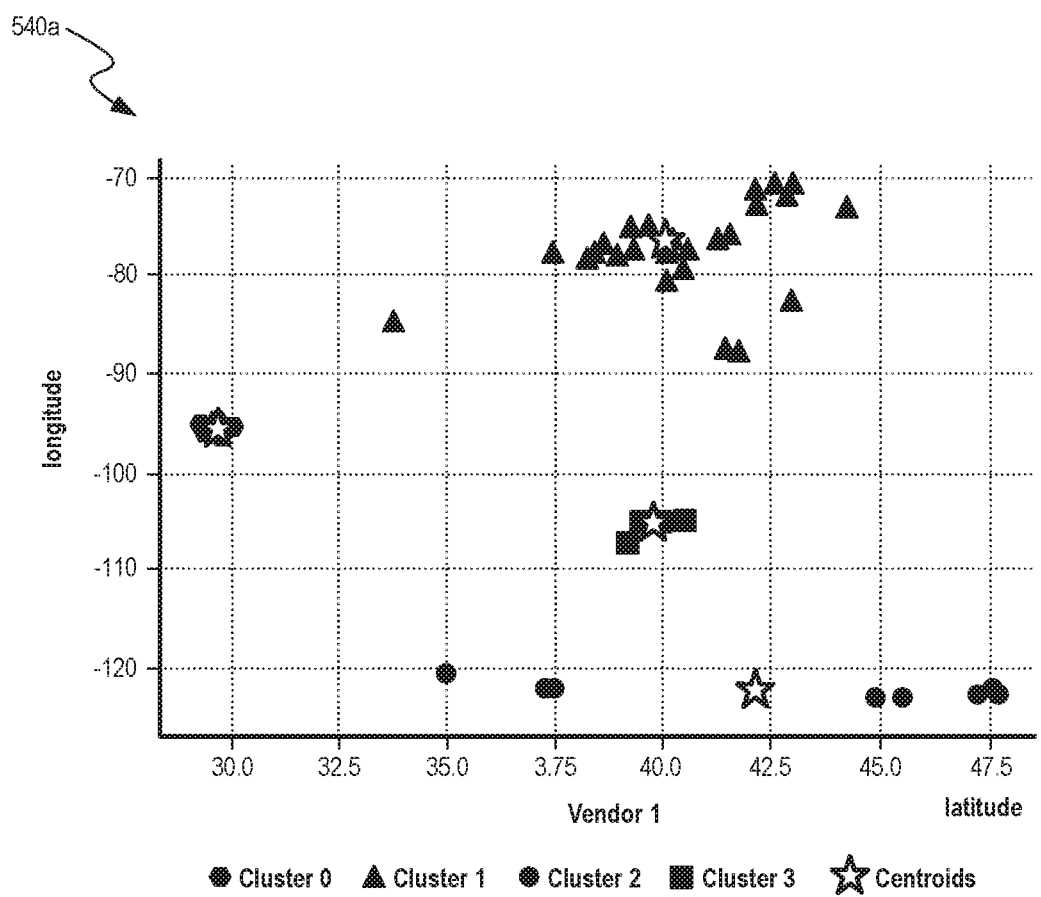
Figure 5G:
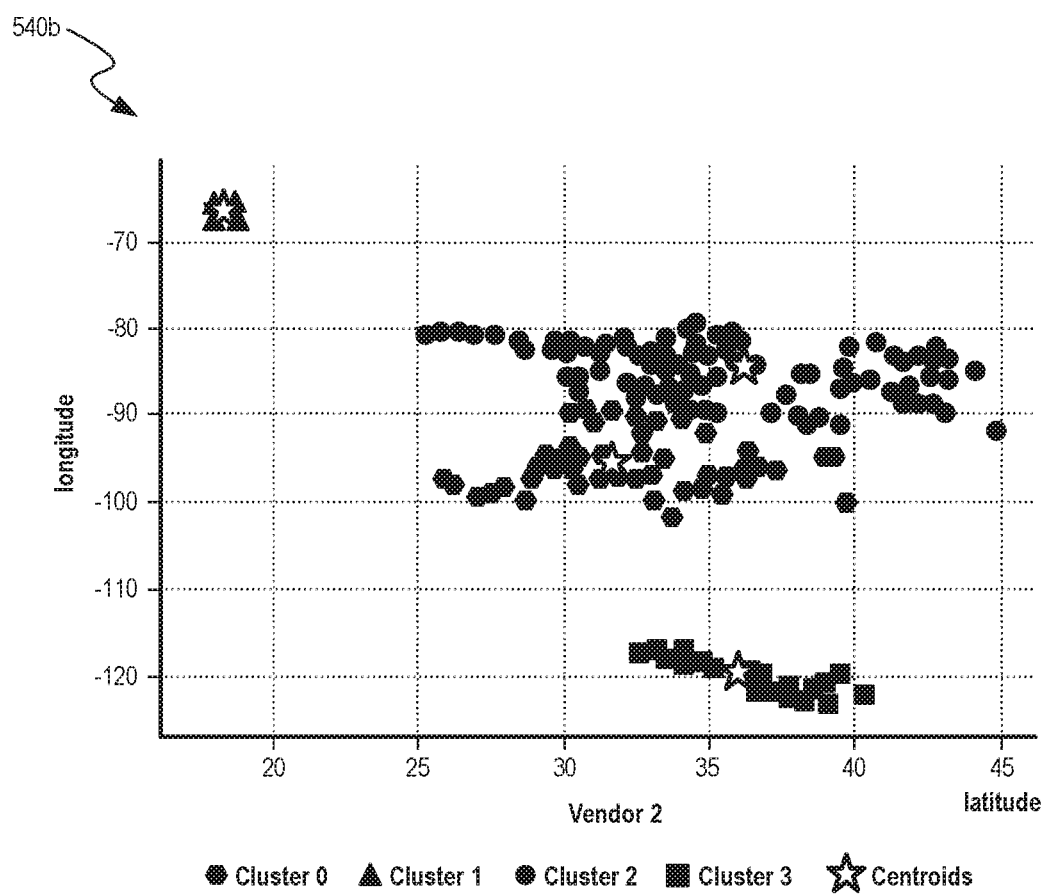
Figure 5H:
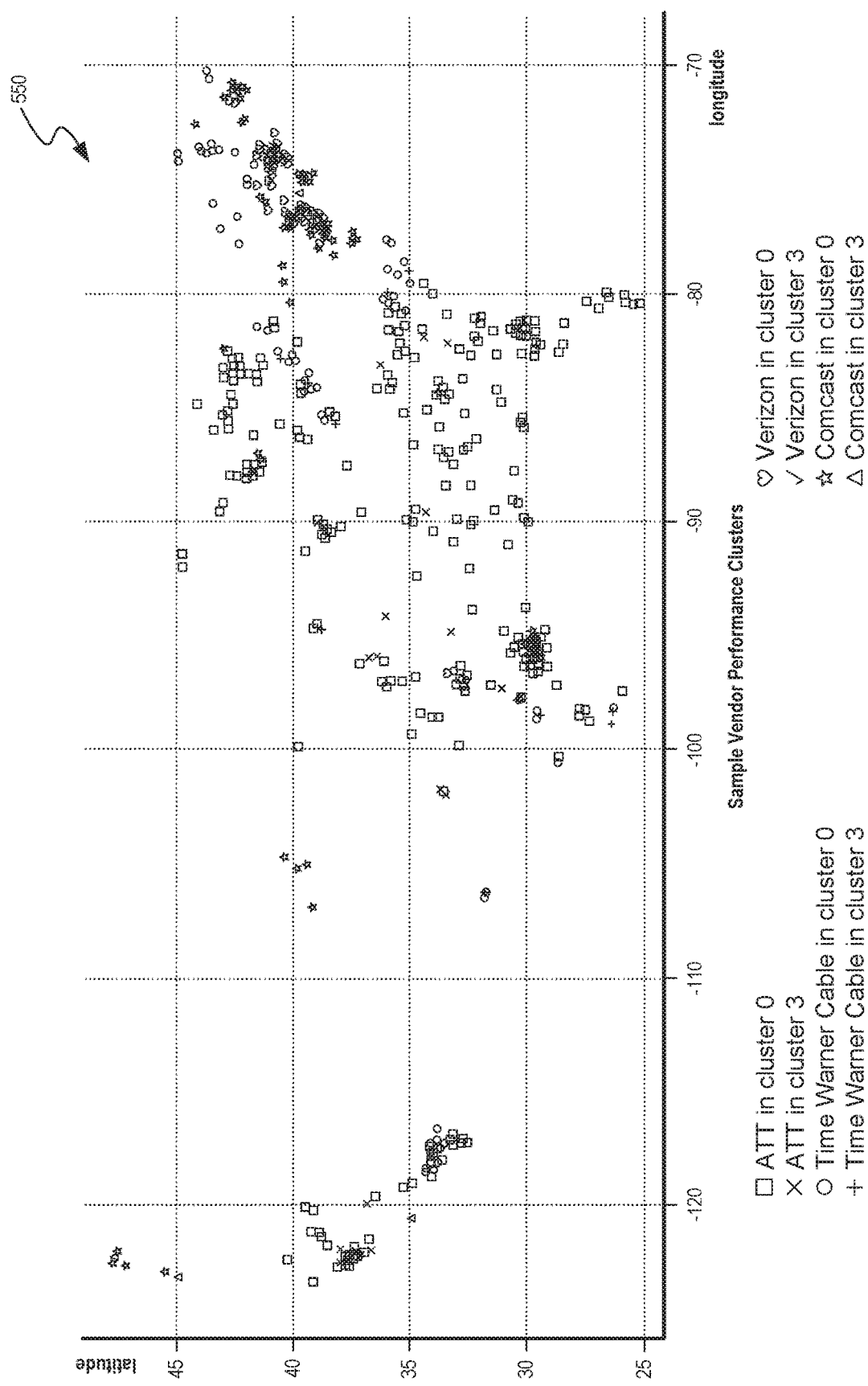

After creating the optimum number of clusters, the clustering module evaluates features of each cluster. For example, the clustering module can determine that a first cluster depicts similar and degraded frame loss ratio, while another cluster depicts similar and degraded latency, and so on. The clustering module then maps performance clusters to one or more clustering parameters (e.g., vendor, market, service level, site locations, health information, time, etc.) to identify sites that have similar performance issues. For example, as depicted in chart 515 of FIG. 5C, the clustering module updates/maps each cluster with site location information to determine similarity of service areas associated with each cluster, and generate a cluster map with locations. FIG. 5E illustrates tables 530a, 530b, and 530c for different clusters mapped to vendors and sites, which illustrate distribution for problem sites with vendors. FIGS. 5F and 5G illustrate charts 540a and 540b respectively, which illustrate that different vendors have different performance issues in different serving areas (e.g., some performance clusters are dominant in a certain vendor network and area). These figures show the correlation among clusters, vendors, site locations, and service levels.

Hidden Fault Detection Module

The hidden fault detection module 240 is configured and/or programmed to generate inferences on root causes of the performance issues (which are likely caused by vendor network issues) using the cluster maps. If a group of nearby sites share similar performance issues over time, then there is a higher probability that something negative happened in the AAV-shared equipment or links. For example, the hidden fault detection module 240 can analyze chart 550 illustrated in FIG. 5H to determine that certain sites have similar performance issues in certain areas, and that certain AAVs have chronic performance issues in certain areas and service type. As another example, for sites in the same area/location, which are marked with same cluster features and that have similar performance problem over time (month to month, week to week, day to day, or other period length), the hidden fault detection module 240 can provide insights that vendor subnet or vendor device which provide connections to the group of sites have high probability of responsibility for end-to-end performance degradation.

Figure 6A:
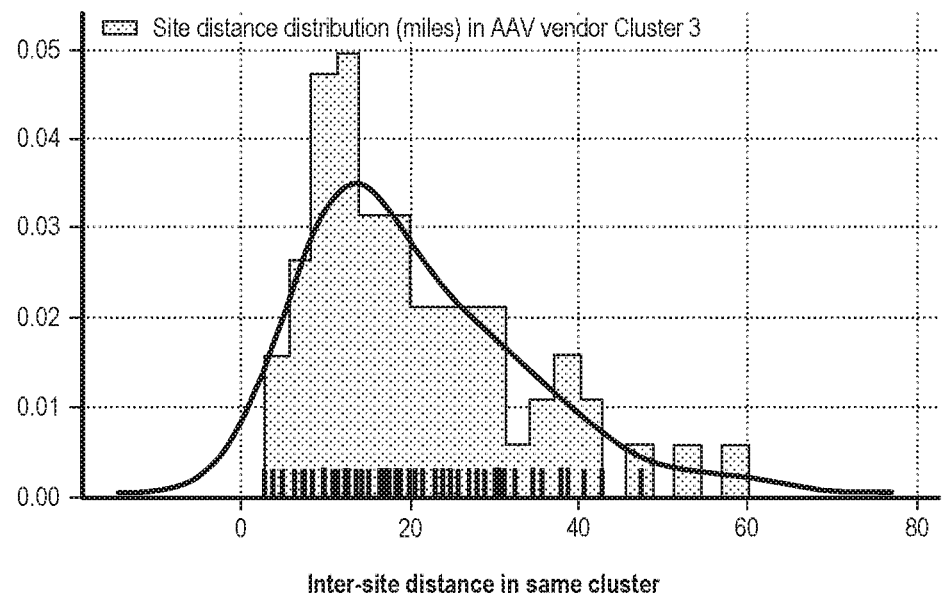
Figure 6B:
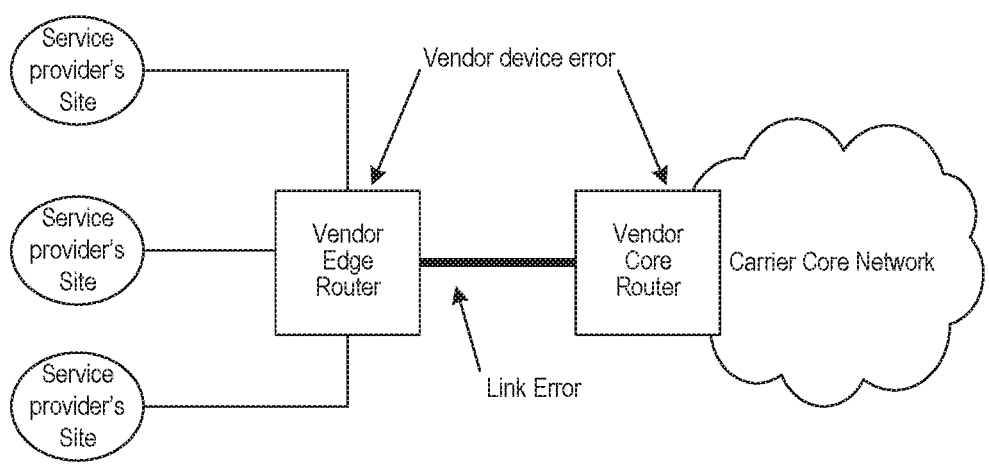
Figure 6C:
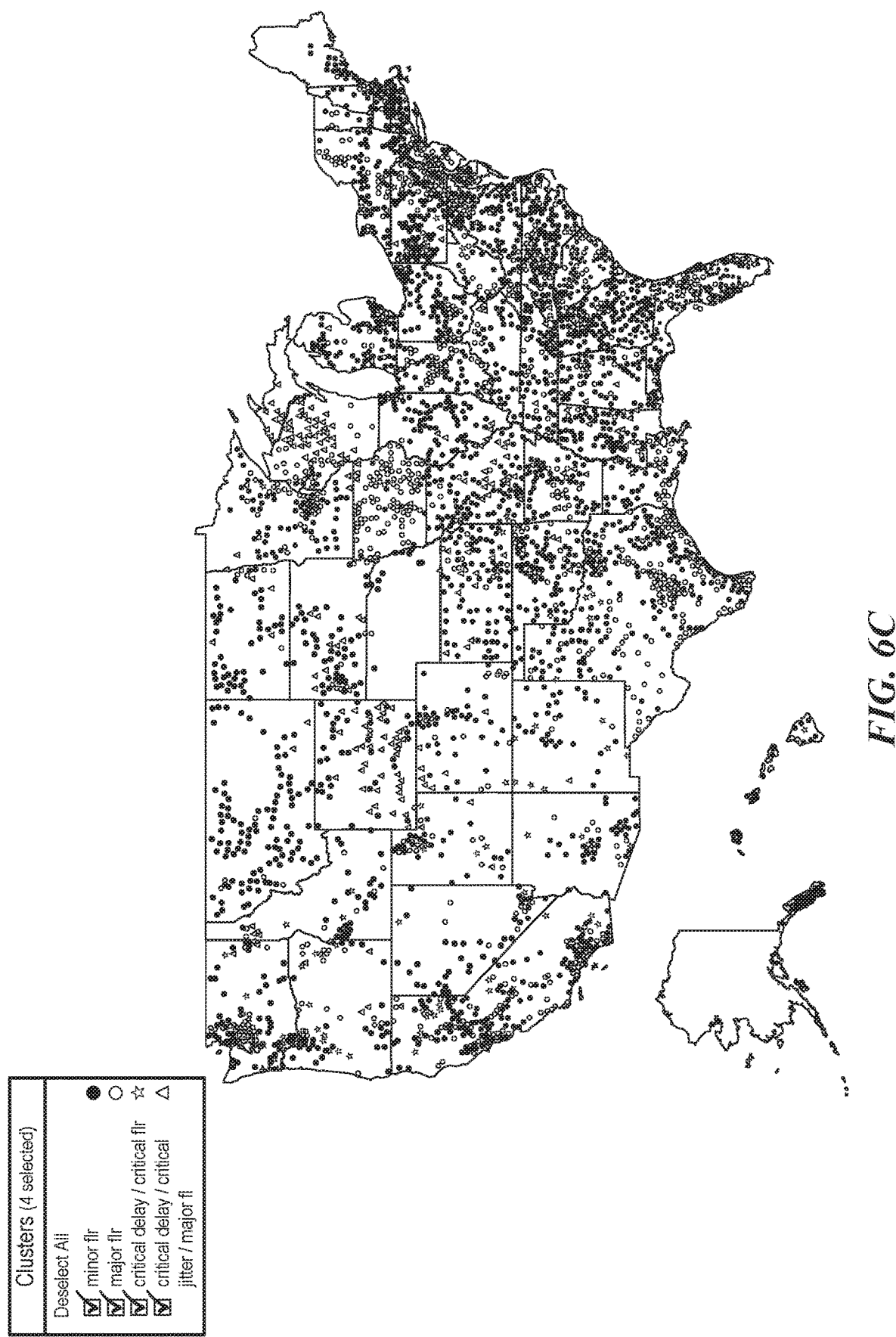
Figure 6D:
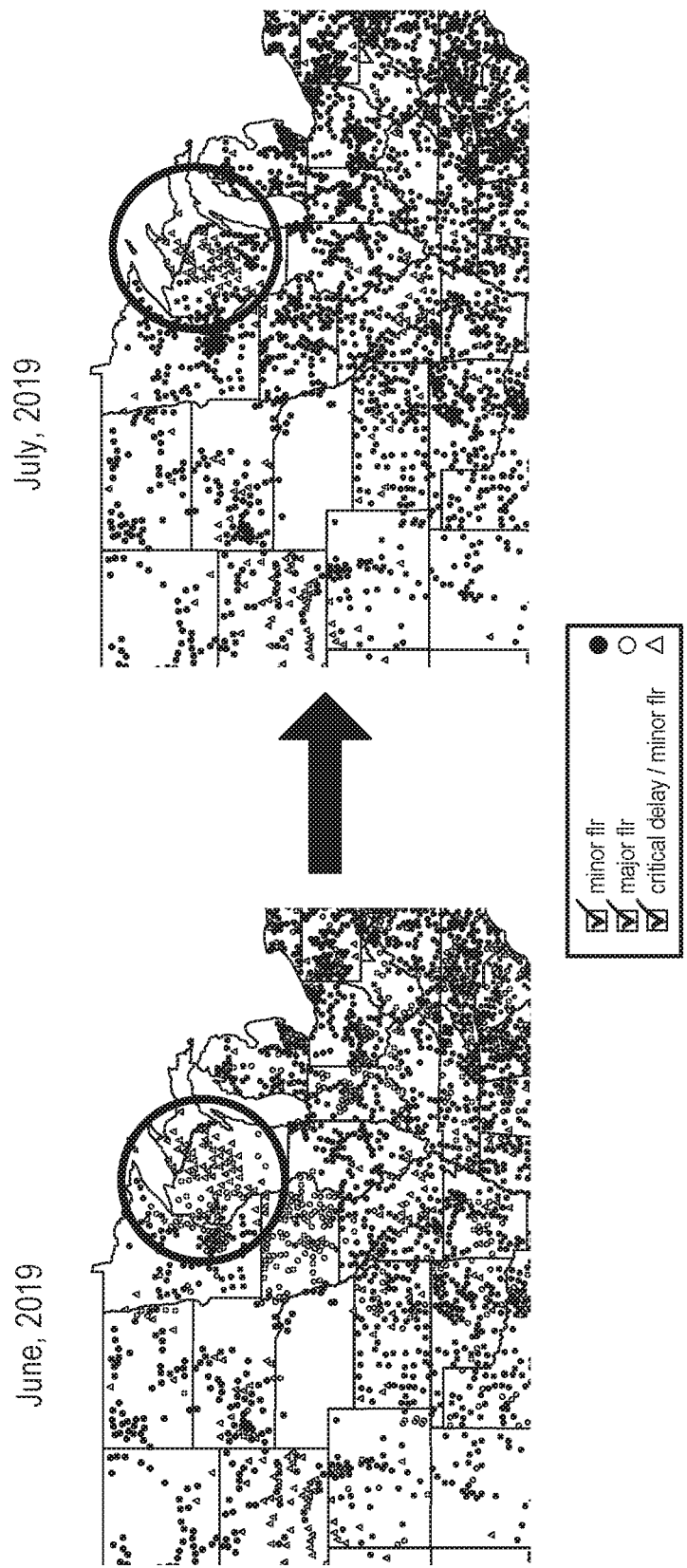
Figures 7A, 7B, 7C:
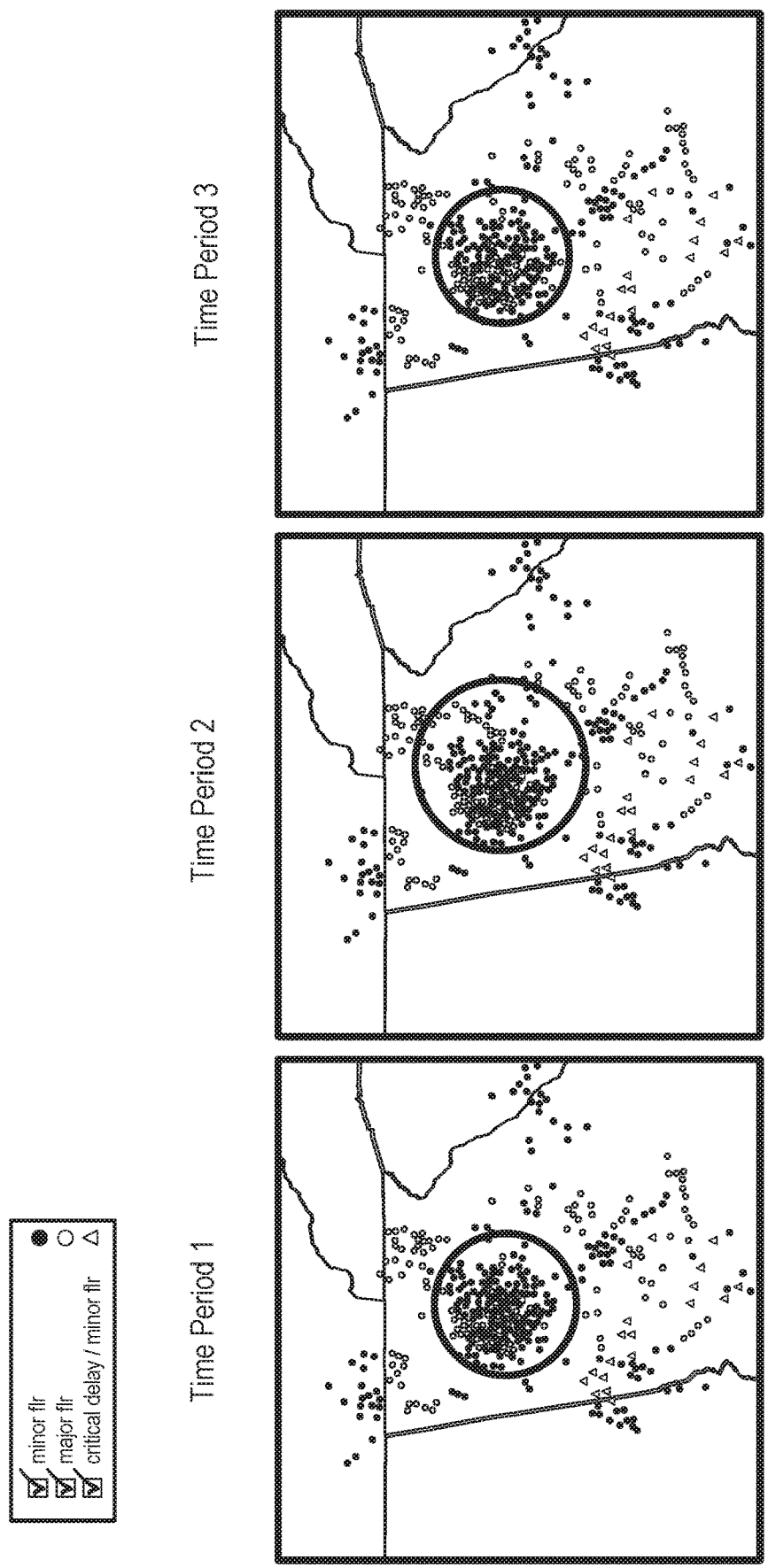

As another example, as illustrated in FIGS. 6A-6B, the hidden fault detection module 240 can analyze the inter-site distances (site distance distribution) in same cluster (AAV vendor cluster 3) to infer with a high probability that the vendor network (device or link) is responsible for degradation of a telecommunication network service provider's performance. The hidden fault detection module 240 can perform periodic performance cluster tracking to identify network fault trends (e.g., vendor service consistency, reliability, potential outage if cluster size grows, etc.) in the telecommunications service network. For example, as illustrated in FIGS. 7A-7C, the hidden fault detection module 240 can perform periodic performance cluster tracking over three different time periods for the same market to identify similar problems in same area with same vendors for a group of sites over time. Similarly, as illustrated in FIG. 6D, the hidden fault detection module 240 can perform periodic performance cluster tracking over two different time periods (one month apart) for the same market (e.g., Milwaukee) to identify similar problems (bad frame loss ratio) in same area with same vendor for a group of sites over time.

Performance Improvement Module

The performance improvement module 250 is configured and/or programmed to use the results of the clustering module and the hidden fault detection module to identify and/or perform network fault remediation actions (e.g., more efficient troubleshooting with the AAVs, perform AAV comparison with detailed market, area, and locations, run strategic vendor selection for better vendor service, and so on). Other examples of fault remediation actions include, but are not limited to the following. For example, operation teams can regularly monitor the results from the hidden fault detection module 240 to identify chronic performance area and related vendor network so that they can issue tickets to the vendor for troubleshooting instead of manual troubleshooting site by site by themselves. As another example, a vendor performance management team can the results from the hidden fault detection module 240 as the basis for discussions with vendors for performance SLA enforcement with much stronger evidence to show related vendor poor performance and responsibility. Even without the vendor's own data, telecommunication network service providers can do apple-to-apple comparison by comparing multiple vendor performance results in same area (which results in more accountability by the vendor). The team can also use the results to choose the best vendor service based on their performance trend and pattern, and then use their network as AAV access to improve site performance. As another example, once the system identifies that more and more sites served by same vendor in a specific area get worse performance over time, the system can then interpret that as a sign that in short future the vendor network may get down or suffer an outage. So the system provides prediction on the potential outage and the telecommunication network service provider's operations team can proactively work with the vendor to do high-priority troubleshooting or maintenance to avoid the potential outage disaster.

In several implementations, the performance improvement module 250 identifies more than one network fault remediation actions/solutions, ranks the identified actions/solutions and then select one or more actions/solutions as candidates for deployment based on one or more of the following factors: agreements with the AAVs, severity of performance degradation, KPI being evaluated, market, vendor, time, location, service level information, cost of deploying the solution, and so on. In some implementations, the ranking factor can be set based on different team job requirements and scope. For example, operation team can set higher priority on severity of performance degradation and focus on sites with the worst performance and do troubleshooting with a group of sites based on the system.

Reporting and Visualization Module

The reporting and visualization module 260 is configured and/or programmed to provide reports (ad hoc, pre-built, etc.) and analysis of network fault trends. FIGS. 6A-7C are example reports that can be provided by the reporting and visualization module 260.

Flow Diagrams

Figure 3:
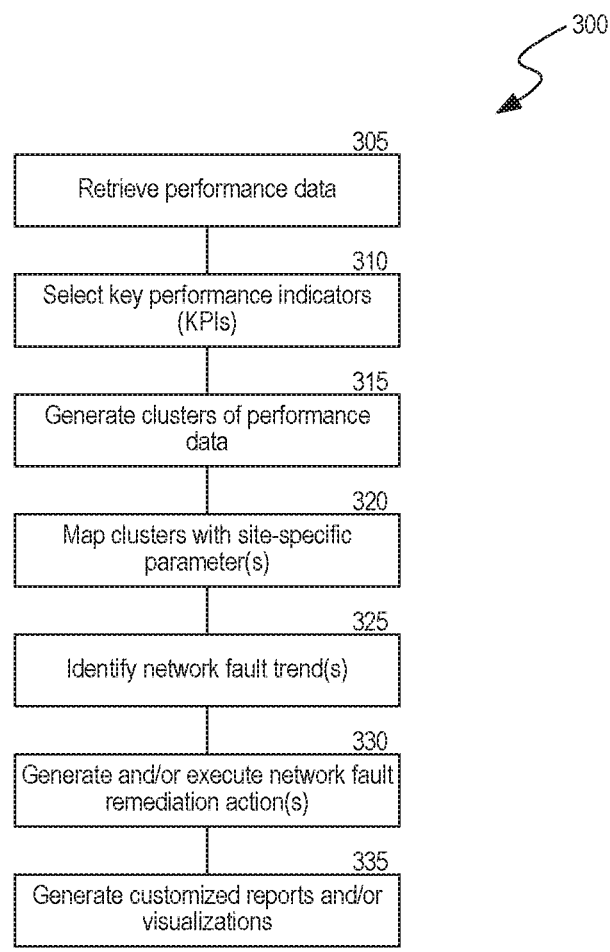
FIG. 3 is a flow diagram illustrating an example process of transport network fault detection and quality of service (QoS) improvement.

FIG. 3 is a flow diagram illustrating a process 300 of transport network fault detection and quality of service (QoS) improvement. Process 300 begins at block 305 where it receives/retrieves/accesses performance measurement data records (AAV performance-related measurements values). The performance measurement data records comprise information about an associated location, an associated vendor, an associated market, and so on. At block 310, process 300 selects key performance indicators (KPIs). For example, as discussed above, process 300 selects a subset of key performance indicators from a set of performance indicators based on a correlation of each performance indicator with network performance. At block 315, process 300 generates a set of clusters of the set of performance measurement data records using values corresponding to key performance indicators in the subset of key performance indicators. The records in each cluster can have similar values for the selected key performance indicators. At block 320, process 300 maps the clusters with at least one clustering parameter (e.g., vendor information, location information, market information, service level information, etc.) to generate mapped updated cluster records. For example, process 300 can first update each cluster with site location information to determine similarity of service areas associated with each cluster, and then map the updated clusters with additional clustering parameters. At block 325, process 300 identifies one or more network fault trends (e.g., sites in certain markets of same vendor suffer from similar performance issues). At block 330, process 300 generates and/or executes network fault remediation solutions/actions to minimize the identified network faults. At block 335, process 300 generates customized reports and/or visualizations (e.g., illustrated in FIGS. 6A-7C) for the analysis.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number can also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations can perform routines having blocks, or employ systems having blocks, in a different order, and some processes or blocks can be deleted, moved, added, subdivided, combined, and/or modified to provide alternative or subcombinations. Each of these processes, message/data flows, or blocks can be implemented in a variety of different ways. Also, while processes or blocks are at times shown as being performed in series, these processes or blocks can instead be performed in parallel, or can be performed at different times. Further, any specific numbers noted herein are only examples: alternative implementations can employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that can be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system can vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects can likewise be implemented in a computer-readable medium. Accordingly, the inventors reserve the right to add additional claims after filing the application to pursue such additional claim forms for other aspects of the technology.

The invention claimed is:

1. A computer-implemented method for detecting faults in a telecommunications service network, the method comprising:
　　receiving a set of performance measurement data records measuring performance of at least one alternative access vendor,
　　　　wherein records in the set of performance measurement data records include information about at least one of: an associated location, an associated vendor, service type, or an associated market;
　　selecting a subset of key performance indicators from a set of performance indicators based on a correlation of each of the set of performance indicators with network performance;
　　generating a set of clusters of the set of performance measurement data records using values corresponding to key performance indicators in the subset of key performance indicators,
　　　　wherein records in each cluster of the set of clusters have similar values for the key performance indicators in the subset of key performance indicators;
　　updating each cluster in the set of clusters with site location information to determine similarity of service areas associated with said each cluster of the set of clusters; and
　　mapping the updated clusters in the set of clusters with at least one clustering parameter to generate mapped updated cluster records,
　　　　wherein the at least one clustering parameter comprises vendor information of the at least one alternative access vendor, location information, market information, service type/level information, or any combination thereof.

2. The method of claim 1, wherein the set of clusters is generated using k-means clustering, and wherein an optimal k value is determined using an elbow methodology.

3. The method of claim 1, wherein the set of clusters is generated using k-means clustering, and wherein an optimal k value is determined using a silhouette methodology.

4. The method of claim 1, further comprising:
　　receiving the set of performance measurement data records for every time period t;
　　generating the mapped updated cluster records for each of the set of performance measurement data records received for each time period t; and
　　analyzing the mapped updated cluster records for each of the set of performance measurement data records received for each time period t to identify at least one network fault trend in the telecommunications service network.

5. The method of claim 1, further comprising:
　　identifying at least one network fault occurring in the telecommunications service network using the generated mapped updated cluster records.

6. The method of claim 1, further comprising:
　　identifying at least one network fault remediation action capable of being performed in the telecommunications service network based on the generated mapped updated cluster records.

7. The method of claim 1, wherein the subset of key performance indicators comprises:
　　latency, or
　　jitter, or
　　packet loss ratio, or
　　availability,
　　or any combination thereof.

8. At least one non-transitory computer-readable medium containing instructions, that when executed by a processor, performs operations for detecting faults in a telecommunications service network, the operations comprising:
　　receiving a set of performance measurement data records measuring performance of at least one alternative access vendor, wherein records in the set of performance measurement data records include information about at least one of: an associated location, an associated vendor, service type or an associated market;

selecting a subset of key performance indicators from a set of performance indicators based on a correlation of each of the set of performance indicators with network performance;

generating a set of clusters of the set of performance measurement data records using values corresponding to key performance indicators in the subset of key performance indicators, wherein records in each cluster have similar values for the key performance indicators in the subset of key performance indicators;

updating each cluster in the set of clusters with site location information to determine similarity of service areas associated with each cluster; and mapping the updated clusters in the set of clusters with at least one clustering parameter to generate mapped updated cluster records, wherein the at least one clustering parameter comprises vendor information of the at least one alternative access vendor, location information, market information, service type/level information, or any combination thereof.

9. The at least one non-transitory computer-readable medium of claim 8, wherein the set of clusters is generated using k-means clustering, and wherein an optimal k value is determined using an elbow methodology.

10. The at least one non-transitory computer-readable medium of claim 8, wherein the set of clusters is generated using k-means clustering, and wherein an optimal k value is determined using a silhouette methodology.

11. The at least one non-transitory computer-readable medium of claim 8, wherein the operations further comprise:

receiving the set of performance measurement data records for every time period t, generating the mapped updated cluster records for each of the set of performance measurement data records received for each time period t, and analyzing the mapped updated cluster records for each of the set of performance measurement data records received for each time period t to identify at least one network fault trend in the telecommunications service network.

12. The at least one non-transitory computer-readable medium of claim 8, wherein the operations further comprise:

identifying at least one network fault occurring in the telecommunications service network using the generated mapped updated cluster records.

13. The at least one non-transitory computer-readable medium of claim 8, wherein the operations further comprise:

identifying at least one network fault remediation action capable of being performed in the telecommunications service network based on the generated mapped updated cluster records.

14. The at least one non-transitory computer-readable medium of claim 8, wherein the subset of key performance indicators comprises:

latency, or jitter, or packet loss ratio, or availability, or any combination thereof.

15. A system for detecting faults in a telecommunications service network comprising at least one non-transitory computer-readable medium having instructions stored thereon, which when executed by one or more processors of the system cause the system to:

receive a set of performance measurement data records measuring performance of at least one alternative access vendor, wherein records in the set of performance measurement data records include information about at least one of: an associated location, an associated vendor, service type, or an associated market;

select a subset of key performance indicators from a set of performance indicators based on a correlation of each of the performance indicators with network performance;

generate a set of clusters of the set of performance measurement data records using values corresponding to key performance indicators in the subset of the key performance indicators, wherein records in each of the set of clusters have similar values for the key performance indicators in the subset of key performance indicators; and map the clusters in the set of clusters with at least one clustering parameter to generate mapped updated cluster records, wherein the at least one clustering parameter comprises vendor information of the at least one alternative access vendor, location information, market information, service type/level information, or any combination thereof.

16. The system of claim 15, wherein the set of clusters is generated using k-means clustering, and wherein an optimal k value is determined using an elbow methodology or a silhouette methodology.

17. The system of claim 15, wherein the instructions when executed by the one or more processors of the system further cause the system to:

receive the set of performance measurement data records for every time period t, generate the mapped updated cluster records for each of the set of performance measurement data records received for each time period t, and analyze the mapped updated cluster records for each of the set of performance measurement data records received for each of the time period t to identify at least one network fault trend in the telecommunications service network.

18. The system of claim 15, wherein the instructions when executed by the one or more processors of the system further cause the system to:

identify at least one network fault occurring in the telecommunications service network using the generated mapped updated cluster records.

19. The system of claim 15, wherein the instructions when executed by the one or more processors of the system further cause the system to:

identifying at least one network fault remediation action capable of being performed in the telecommunications service network based on the generated mapped updated cluster records.

20. The system of claim 15, wherein the subset of key performance indicators comprises:
- latency, or
- jitter, or
- packet loss ratio, or
- availability,
- or any combination thereof.

* * * * *